(12) United States Patent
Casara et al.

(10) Patent No.: US 8,758,485 B2
(45) Date of Patent: Jun. 24, 2014

(54) PROCESS FOR THE RECOVERY OF AMMONIA FROM A GASEOUS STREAM

(75) Inventors: Paolo Casara, San Donato Milanese (IT); Alessandro Gianazza, Legnano (IT); Ivano Miracca, Milan (IT)

(73) Assignee: Saipem S.p.A., San Donato Milanese (IT)

( * ) Notice: Subject to any disclaimer, the term of this patent is extended or adjusted under 35 U.S.C. 154(b) by 0 days.

(21) Appl. No.: 13/143,988

(22) PCT Filed: Jan. 11, 2010

(86) PCT No.: PCT/EP2010/000189
§ 371 (c)(1),
(2), (4) Date: Sep. 28, 2011

(87) PCT Pub. No.: WO2010/081707
PCT Pub. Date: Jul. 22, 2010

(65) Prior Publication Data
US 2012/0039787 A1 Feb. 16, 2012

(30) Foreign Application Priority Data
Jan. 13, 2009 (IT) .................................. MI09A0025

(51) Int. Cl.
*B01D 47/00* (2006.01)
(52) U.S. Cl.
USPC .............................. 95/232; 423/237; 423/238
(58) Field of Classification Search
None
See application file for complete search history.

(56) References Cited

U.S. PATENT DOCUMENTS

| | | | | |
|---|---|---|---|---|
| 4,424,072 A | * | 1/1984 | Lerner | 71/28 |
| 4,507,129 A | | 3/1985 | Storen | |
| 5,223,238 A | * | 6/1993 | Czuppon | 423/359 |
| 5,749,941 A | * | 5/1998 | Jansen et al. | 95/44 |
| 6,585,807 B2 | * | 7/2003 | Umino et al. | 95/178 |
| 2002/0014154 A1 | * | 2/2002 | Witzko et al. | 95/178 |
| 2003/0172809 A1 | * | 9/2003 | Speth | 95/128 |
| 2011/0091369 A1 | * | 4/2011 | Casara et al. | 423/356 |

FOREIGN PATENT DOCUMENTS

| | | |
|---|---|---|
| DE | 36 31 251 | 3/1988 |
| EP | 0 514 902 | 11/1992 |
| EP | 1 695 755 | 8/2006 |

(Continued)

OTHER PUBLICATIONS

U.S. Appl. No. 13/387,836, filed Jan. 30, 2012, Casara.

(Continued)

*Primary Examiner* — Duane Smith
*Assistant Examiner* — Phillip Shao
(74) *Attorney, Agent, or Firm* — Oblon, Spivak, McClelland, Maier & Neustadt, L.L.P.

(57) ABSTRACT

A process for the recovery of ammonia contained in a gaseous stream is described, said process comprising the following phases: (a) subjecting the gaseous stream containing ammonia to a washing (S) with an aqueous washing solution (5a) having a pH lower than 7.0, with the formation of a purified gaseous stream (6) and an aqueous solution (7) containing an ammonium salt; (b) subjecting the aqueous solution containing the ammonium salt coming from phase (a) to a distillation process (MD) with a hydrophobic microporous membrane at a temperature ranging from 50 to 250° C. and a pressure ranging from 50 KPa to 4 MPa absolute with the formation of a regenerated washing solution (16) and a gaseous stream (18) comprising $NH_3$ and $H_2O$; (c) recycling said generated washing solution to phase (a). The equipment for carrying out the above process is also described.

16 Claims, 1 Drawing Sheet

(56) References Cited

FOREIGN PATENT DOCUMENTS

| EP | 2386346 | A1 | * | 11/2011 |
| GB | 844294 | A | * | 8/1960 |
| JP | 53075168 | | | 7/1978 |

OTHER PUBLICATIONS

International Search Report Issued Jun. 18, 2010 in PCT/EP10/000189 filed Jan. 11, 2010.

* cited by examiner

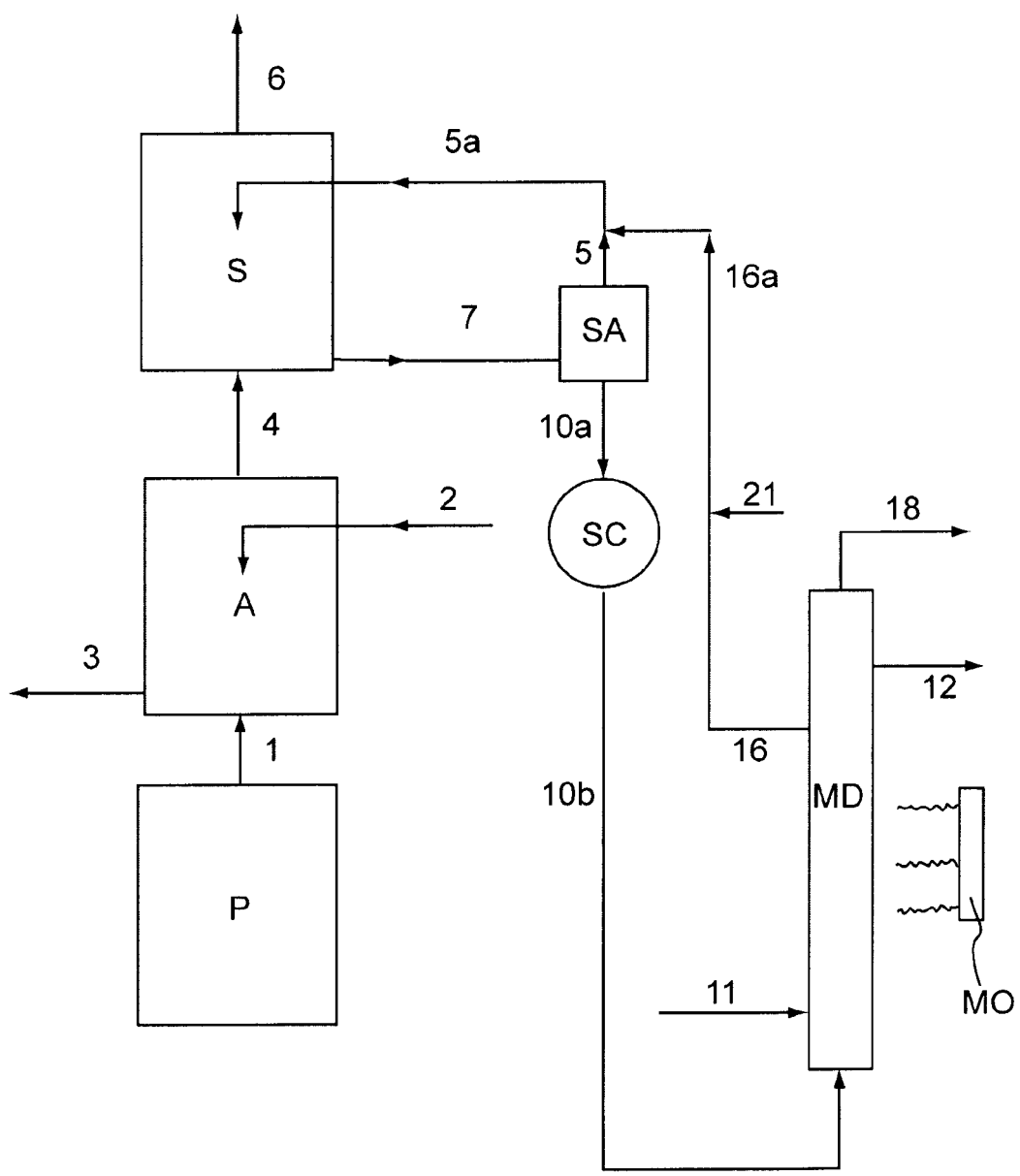

PROCESS FOR THE RECOVERY OF AMMONIA FROM A GASEOUS STREAM

The present invention relates to a process for the recovery of ammonia from a gaseous stream.

The process, object of the present invention, is particularly suitable for the recovery of ammonia from a gaseous stream coming from a synthesis process of urea.

Emissions of gaseous ammonia into the atmosphere produced by numerous industrial activities represent a particularly significant environmental problem.

In order to limit the environmental impact associated with this pollutant, national and international environmental regulations are imposing increasingly restrictive limits to emissions into the atmosphere coming from industrial processes. The necessity is therefore strongly felt for finding new technical solutions for abating the ammonia in industrial emissions or for recovering ammonia from these streams, considering the high commercial value of this substance as raw material in numerous industrial processes.

In particular, the synthesis process of urea is an industrial process which generates high volumes of gaseous streams containing ammonia.

The synthesis of urea is effected by the reaction of ammonia and carbon dioxide at high pressure and temperature, the subsequent separation of the urea from the mixture containing the non-reacted products and recycling of the same to the reactor.

All industrial processes for the preparation of urea are therefore based on direct synthesis according to the following reaction:

$$2\,NH_3 + CO_2 \leftrightarrow CO(NH_2)_2 + H_2O \tag{A}$$

This synthesis takes place in two distinct reaction steps:

$$NH_3 + CO_2 \leftrightarrow (NH_2)COONH_4 \tag{A'}$$

$$(NH_2)COONH_4 \leftrightarrow CO(NH_2)_2 + H_2O \tag{A''}$$

In the first step (A') an exothermic equilibrium reaction takes place having a high reaction rate at room temperature, which however, at the high temperatures required by step (A''), requires high pressures to reach a favourable equilibrium.

In the second step (A'') an endothermic reaction takes place, which only reaches a significant rate at high temperatures (>150° C.), with an equilibrium state which, at 185° C., starting from a mixture of reagents in a stoichiometric ratio, leads to a $CO_2$ conversion slightly higher than about 50%. This unsatisfactory conversion can be conveniently increased by raising the $NH_3/CO_2$ ratio.

Processes for the production of urea by direct synthesis starting from ammonia and carbon dioxide have been widely illustrated and described in the specific literature of the field. A large review of the most common processes for the production of urea can be found, for example, in "Encyclopedia of Chemical Technology" Ed. Kirk-Othmer, Wiley Interscience, fourth ed. (1998), Supplement, pages 597-621.

Industrial processes for the production of urea normally carry out the synthesis in a reactor fed with $NH_3$, $CO_2$ and with the aqueous solutions of ammonium carbonate and/or carbamate coming from the recycled streams of the non-converted reagents, at temperatures ranging from 150 to 215° C., at pressures of at least 130 atm, with a $NH_3/CO_2$ molar ratio of between 2.5 and 5, calculated with respect to the sum of the feeding streams, including ammonia in the form of ammonium salt. In addition to the water formed and excess $NH_3$ fed, the reactor effluent still contains considerable quantities of $CO_2$, mainly in the form of non-converted ammonium carbamate.

The molten urea is solidified in the final section of the plant, into a granular form, in suitable granulators or prilling towers, by cooling with air.

Many of the environmental problems associated with urea production plants are specifically linked to the above-mentioned granulation or prilling sections.

The processes which are effected in this section, in fact, currently cause the emission into the atmosphere of large quantities of air contaminated by ammonia (about 50-250 $mg/Nm^3$ air), urea (about 20-200 $mg/Nm^3$ air) and traces of formaldehyde.

Ammonia is also contained, also in relatively high concentrations, up to 10 $g/Nm^3$, in industrial gaseous streams such as those produced in the distillation of coke, from which it can be conveniently extracted and used as raw material in industry.

The state of the art describes various abatement processes of the ammonia contained in gaseous streams. Various industrial processes have also been developed, which enable not only the separation but also the recovery of pure ammonia. For the recovery of ammonia from coking gases, for example, the patent U.S. Pat. No. 3,024,090 describes a process in which the gases are subjected to a washing with an acid solution of ammonium phosphate (mixture of mono-acid phosphate and di-acid phosphate), followed by a stripping of the solution. This method however does not reach high efficiency rates and cannot be applied to gaseous streams with low ammonia contents.

U.S. Pat. No. 4,424,072 describes an abatement process of ammonia contained in a low concentration in a gaseous stream by means of acid washing, for example with nitric acid, to obtain an ammonium salt in aqueous solution.

In particular, when the gaseous stream containing ammonia which is subjected to acid washing, is a gaseous stream coming from the final prilling or granulation section of a urea synthesis process, the aqueous solution containing the ammonium salt also contains urea and traces of formaldehyde.

The aqueous solution containing the ammonium salt cannot be recycled as such to the synthesis and/or concentration sections of urea, as the latter could thus be contaminated by ammonium salts, which are absolutely undesirable for the purposes of certain subsequent uses of urea, for example for the synthesis of melamine.

Furthermore, the ammonium salt thus obtained would have such specifications as to make it unusable, as it is not at all suitable for the purposes of market interest.

The treatment of the aqueous solution comprising the ammonium salt with a membrane electrolytic process (MEP), is known from EP 1,695,755. This treatment allows the recovery of the acid used for the removal of ammonia, avoiding the recycling of the aqueous solution containing the ammonium salt to the urea plant, thus overcoming the problem of possible contaminations.

The solution suggested in EP 1,695,755 envisages the treatment of the aqueous solution comprising the ammonium salt with a membrane electrolytic process (MEP) which allows the recovery of the acid used for washing the ammonia present in the gaseous stream, which can be suitably recycled. An aqueous solution of ammonium hydroxide is also obtained, which can be thermally treated to obtain a gaseous ammonia stream which can be recycled to the urea synthesis plant.

The solution suggested in EP 1,695,755, however, has various drawbacks, in particular the production of ammonia from the electrodialysis cell in the form of a diluted solution of ammonium hydroxide, which requires specific and expensive thermal stripping treatment before being recycled in a sufficiently concentrated form to the urea synthesis plant.

Furthermore, the treatment of the aqueous solution comprising the ammonium salt with a membrane electrolytic process (MEP), as described in EP 1,695,755, can also allow the passage of undesired ions which lead to an aqueous solution of ammonium hydroxide which cannot be completely recycled, or to a decrease in the process efficiency due to the undesired back-migration of neutral $NH_3$ through the membrane.

An alternative technique which allows the recovery of gaseous ammonia from solutions in which it is dissolved, is membrane distillation by means of microporous membrane devices, known as "membrane contactors" (MC).

MC devices are devices with which it is possible to put a gaseous phase in contact with a liquid phase to allow a controlled mass transfer of the chemical species present therein, avoiding the dispersion of a one phase within the other.

In membrane distillation, the mass transfer process takes place at the surface of a hydrophobic microporous membrane, more specifically at the outlet of the pores of the membrane. The driving force of the diffusion of a chemical species from the fluid on one side of the membrane (feeding fluid or stream) to that one situated on the opposite side (transport fluid or stream) is the temperature, pressure and concentration gradient existing between the two fluids.

Separation process by means of MC devices differ from inverse osmosis, micro-, nano- and ultrafiltration processes as they do not require the application of high pressure differences between the two fluids on the opposite sides of the membrane.

In membrane distillation processes, hydrophobic membranes having different configurations can be used, such as for example flat membranes, spiral-wound membranes or hollow fibres.

Thanks to the high porosity of the membrane, this type of distillation process operates with a much higher contact surface between the two fluids with respect to that of a traditional distillation, with obvious advantages from the viewpoint of productivity and reduction in the size of the equipment used.

The treatment of solutions containing ammonia by means of membrane distillation is known, for example, from the publication "Application of vacuum membrane distillation for ammonia removal" by EL-Bourawi et al. (Journal of Membrane Science 301 (2007), 200-209).

This document shows that the recovery of ammonia is greatly influenced by the pH of the solution, proving to be effective only if applied to solutions containing ammonia in which the pH is raised to values of around 11 by the addition of basifying agents. On an industrial scale, the separation of ammonia carried out under the above conditions, has the clear disadvantage of using up high quantities of basifying agent, with a consequent increase in the costs of the ammonia recovery process.

The Applicant has now found a process which allows the drawbacks of the known art described above to be overcome, further improving the recovery process of ammonia from a gaseous stream.

An object of the present invention therefore relates to a process for the recovery of ammonia contained in a gaseous stream, said process comprising the following phases:

(a) subjecting the gaseous stream containing ammonia to a washing with an aqueous washing solution having a pH lower than 7.0, with the formation of a purified gaseous stream and an aqueous solution containing an ammonium salt;

(b) subjecting the aqueous solution containing the ammonium salt coming from phase (a) to a distillation process with a hydrophobic microporous membrane at a temperature ranging from 50 to 250° C. and a pressure ranging from 50 KPa to 4 MPa absolute with the formation of a regenerated washing solution and a gaseous stream comprising $NH_3$ and $H_2O$;

(c) recycling said regenerated washing solution to phase (a).

In a preferred embodiment of the above process, the gaseous stream comprising $NH_3$ and $H_2O$ leaving phase (b) is recycled to a synthesis plant of urea.

An object of the present invention also relates to equipment for carrying out the above process, comprising:

a washing unit (scrubber) in which a gaseous stream containing ammonia is put in contact with an aqueous washing solution, a unit for subjecting an aqueous stream of an ammonium salt to distillation with a hydrophobic microporous membrane, with the formation of a gaseous stream comprising ammonia and $H_2O$ and a regenerated washing solution, said distillation unit being connected to the washing unit from which it receives the aqueous stream of an ammonium salt.

The gaseous stream treated according to the process of the present invention can derive from various industrial processes, and is preferably a gaseous purging stream coming from a synthesis process of urea.

The gaseous purging stream can derive from various sections and equipment of the urea synthesis process. In the preferred and most relevant case, as a result of the gas volumes normally involved, it comes from the urea solidification section which, as it is known, represents the part of the synthesis plant in which the urea, molten or in a concentrated solution, is cooled and solidified into a generally granular form, suitable for transportation and use in agriculture. Various solidification technologies are possible, the most common and preferred, as previously described, being known as granulation and prilling, which use, as cooling agent, a gaseous stream in large volumes.

There are, however, also other sources of purging or vent gaseous streams containing ammonia as polluting agent in urea plants, which cannot be released without an adequate recovery treatment, such as the streams in the suction ducts located in different areas of the facility, in the storage areas, or the streams for purging the inert products. All these streams can be treated according to the present invention, obtaining the double advantage of an improvement in the environmental impact and a further recovery of ammonia to be recycled to the plant.

The gaseous purging stream coming from the synthesis process of urea generally consists of a gas contaminated by ammonia (about 50÷250 mg/$Nm^3$ gas), urea (about 30÷200 mg/$Nm^3$ gas) plus traces of formaldehyde.

This gas normally consists of air, but processes which use an inert gas different from air are not excluded from the scope of the present invention; in these cases, said gaseous purging stream mainly consists of said inert gas.

The gaseous purging stream preferably comes from the urea synthesis plant at a temperature of about 45-100° C. and is subjected to a preliminary washing with water to eliminate most of the urea and formaldehyde present. Also in this case, however, the gaseous purging stream which is subjected to phase a) of the process according to the present invention, still contains urea and traces of formaldehyde.

Through the treatment of the subsequent phase b), the urea at least partially hydrolyzes to give $CO_2$ and $NH_3$; this represents a particular advantage with respect to the processes of the state of the art, as the accumulation of urea in the washing solution, as a result of the recycling (phase (c)) of the regenerated washing solution coming from the membrane distillation, can progressively reduce the efficiency of the scrubber. Furthermore, thanks to the partial hydrolysis of the urea, it is possible to recover further ammonia from the urea, at the same time avoiding its release to the environment.

Phase (a) is preferably carried out with an aqueous washing solution having a pH ranging from 5 to 6.5, regardless of the presence or absence of urea in the gaseous stream to be treated. The temperature of the washing solution is conveniently maintained at 15 to 70° C.

The aqueous washing solution used in phase (a) is preferably a buffer solution consisting of a conjugate acid-base pair whose pH falls within the range defined above. Typical buffer solutions suitable for the purpose are, for example, those consisting of a conjugate acid-base pair deriving from phthalic acid, oxalic acid, phosphoric acid, citric acid, aryl- and alkyl-phosphonic acids. The molar ratio between conjugate acid and base is determined on the basis of the pH desired according to the laws of chemical equilibrium.

The washing in phase (a) is more preferably carried out with a buffer solution consisting of the conjugate acid-base pair $H_2PO_4^-/HPO_4^{2-}$ (hereafter also indicated as "diacid phosphate/monoacid phosphate pair"), at a temperature ranging from 40 to 60° C.

In this case, during the treatment of the gaseous stream in phase (a), the species of the conjugate acid-base pair $H_2PO_4^-/HPO_4^{2-}$ react with the gaseous ammonia, shifting the equilibrium towards the formation of $(NH_4)HPO_4^-$. Even more preferably, the buffer solution consists of a mixture in equilibrium of the same ammonium salts $(NH_4)_2HPO_4$ and $(NH_4)H_2PO_4$, present in the aqueous solution of phase (a) in dissociated form. The absorption of ammonia, however, causes further formation of $(NH_4)_2HPO_4$ and the solution leaving phase (a) is therefore enriched with the ammonia present in the gaseous stream treated.

The overall molar concentration of the conjugate acid-base pair in the washing solution used in phase (a) preferably ranges from 0.5 M to 5 M, more preferably from 1 M to 4 M. Suitable buffer solutions consisting of the diacid phosphate/monoacid phosphate pair have an overall concentration of the species $H_2PO_4^-$ e $HPO_4^{2-}$ ranging from 20 to 40% by weight, preferably from 30 to 35% by weight.

When the process according to the present invention is applied to a gaseous stream containing ammonia coming from a urea synthesis plant, the aqueous solution containing the ammonium salt leaving phase (a) also contains urea and traces of formaldehyde.

The gaseous stream leaving phase (a) of the process according to the present invention is a stream substantially free of ammonia. The gaseous stream leaving phase (a) consists of substantially pure air or another inert gas (for example nitrogen). If the gaseous stream treated in phase (a) comes from a urea synthesis process, for example, the gaseous stream leaving the same phase (a) typically has an ammonia content ranging from 10 to 25 mg/Nm³ gas and a urea content ranging from 5 to 30 mg/Nm³ gas. If the purified gaseous stream consists of air or nitrogen, it can be released into the atmosphere without further treatment as it complies with the environmental regulations in force.

In phase (b) of the process according to the present invention, the aqueous solution containing the ammonium salt coming from phase (a) is subjected to a hydrophobic membrane distillation process (MD) at a temperature ranging from 50 to 250° C. and a pressure ranging from 50 KPa to 4 MPa absolute, with the formation of a regenerated washing solution, i.e. substantially without ammonia, and a gaseous stream comprising ammonia, which has passed through the microporous membrane in vapour form. The gaseous stream also comprises water in the form of vapour.

If the gaseous stream fed to phase (a) is a purging stream coming from a urea synthesis plant, the gaseous stream leaving phase (b) preferably also comprises $CO_2$.

In phase (b), due to the treatment conditions applied, the shift of equilibria of the conjugate acid-base pair of the buffer solution takes place, together with the formation of neutral ammonia which is released in gaseous form through the pores of the membrane.

In the non-limiting case in which an aqueous washing solution is used in phase (a), consisting of a buffer solution containing the conjugate acid-base pair $H_2PO_4^-/HPO_4^{2-}$, the following reaction (1) takes place in phase (b):

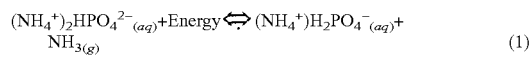

$$(NH_4^+)_2HPO_4^{2-}{}_{(aq)} + \text{Energy} \rightleftharpoons (NH_4^+)H_2PO_4^-{}_{(aq)} + NH_{3(g)} \qquad (1)$$

wherein the term "Energy" represents the total energy supplied to the solution containing the ammonium salt subjected to membrane distillation in phase (b), said energy depending on the operating conditions of temperature, pressure, irradiation with electromagnetic waves, etc., which contribute to shifting the equilibrium towards the formation of the diacid phosphate ion and free ammonia.

The operating conditions of phase (b) are selected by the expert in the field so as to guarantee the equilibrium shift of the reaction (1) towards the formation of free ammonia in gaseous form.

The free ammonia obtained by the equilibrium shift of the phosphorus and ammonium ions in aqueous solution, migrates in vapour phase according to the phase equilibrium under the pressure and temperature conditions of the process and is separated as a gaseous stream.

Phase (b) is preferably carried out by heating the membrane distillation unit to favour reaching the desired temperature and removing the ammonia.

The temperature and pressure conditions in phase (b) must be selected so as to lead to the formation of the regenerated washing solution and gaseous stream containing ammonia. In particular, the operating conditions must be such as to obtain the evolution of gaseous ammonia.

If the gaseous stream from which the ammonia is recovered does not contain urea, phase (b) is preferably carried out at a temperature ranging from 100 to 140° C. and a pressure ranging from atmospheric pressure to about 200 KPa absolute.

If the gaseous stream fed to phase (a) also contains urea (for example, a purging stream coming from a urea synthesis plant), phase (b) is preferably carried out at a temperature ranging from 100 to 200° C., more preferably from 130 to 180° C., and at a pressure ranging from atmospheric pressure to 2 MPa absolute, preferably from 0.15 to 1.5 MPa absolute.

In a preferred embodiment of the present invention, by effecting the membrane distillation phase of an aqueous solution also comprising urea at about 0.3 MPa and a temperature of about 150° C., it is possible to obtain a stream comprising $NH_3$, $H_2O$ and $CO_2$ characterized by a concentration of ammonia ranging from 5 to 35% by weight, more preferably from 10 to 25% by weight.

In phase (b), the pressure of the gaseous stream comprising ammonia, which flows on one side of the membrane (vapour side), must be maintained at a value lower than or equal to the pressure of the solution to be treated which flows on the opposite side (liquid side). Furthermore, the difference between the pressure of the liquid side and that of the vapour side must be lower than the pore wetting pressure, in order to avoid the passage of the solvent in liquid phase (water) through the pores of the membrane and the subsequent mixing of the same with the gaseous stream comprising ammonia. The pore wetting pressure is variable and depends on the constructive characteristics of the membrane and type of material forming the membrane itself.

The microporous membrane distillation process is preferably carried out by means of MC devices comprising any form of hydrophobic microporous membranes, such as for example hollow fibres, flat membranes, spiral-wound membranes, etc.

The microporous membrane distillation process is preferably carried out by self-stripping, i.e. in the absence of an additional transport stream. In order to obtain a greater extraction of $NH_3$, a gas or liquid stream can possibly be used as transport stream, maintained at a pressure close to that of the solution containing the ammonium salt (feeding stream). Although, in this case, the transport stream is preferably a stream of water vapour, it can also be a stream of $CO_2$ or other inert gas, or a liquid stream (for example water), provided the above pressure conditions are guaranteed.

The membranes used for the purposes of the present invention typically consist of materials based on hydrophobic polymers, for example fluorinated polymers and copolymers, such as polytetrafluoroethylene (PTFE), polyvinylidenefluoride or Nafion®, certain polyolefins with a high crystallinity, such as isotactic polypropylene, polyacrylonitrile, polysulfones. These materials offer a high thermal resistance (up to 220-250° C.), chemical and mechanical resistance. The maximum pressure difference that can be sustained by these membranes is approximately 100 kPa. This type of membrane is commercially available in the form of modular MC devices.

In the process according to the present invention, the heating of the MC device is preferably effected by irradiation with electromagnetic radiations having a frequency within the microwave range. For this purpose, microwave generation devices known in the state of the art can be used. The advantage of the use of microwaves is that selective heating of the molecules of water, ammonia and other polar molecules present in liquid phase can be obtained, avoiding a significant heating of the molecules present in vapour form. This enables thermal energy to be supplied to the feeding stream, favouring the subsequent permeation of gaseous ammonia and possibly $CO_2$ through the membrane.

Furthermore, the use of microwaves also prevents the wetting of the pores of the membrane. Should flooding of the pores occur due to an overpressure on the side of the membrane in which the solution to be treated flows, the selective heating of the liquid water molecules by means of microwaves allows the liquid water which has penetrated inside the pores, to evaporate, thus regenerating the membrane in situ without interrupting the functioning of the equipment and avoiding the application of counter-pressures.

Furthermore, it has been found that the use of microwaves for heating the liquid has the additional advantage of favouring the dispersion of the ammonia in the possible gaseous transport stream, without causing its undesired heating and increasing the energy consumption.

In order to supply heat by irradiation with microwaves, MC devices must be used in which the outer casing consists of materials transparent to microwaves, for example materials such as PTFE, glass, Pyrex, etc.

Heating by means of microwaves is not only easy to apply but also allows the thermal energy supplied to the membrane distillation device to be accurately modulated. Microwave heating devices, moreover, having conversion efficiencies of electric energy into microwaves in the order of about 70%, contribute to obtaining an overall higher energy yield of the ammonia recovery process.

The membrane distillation of phase (b) returns the following products: a regenerated washing solution, preferably with a pH ranging from 5 to 6.5 and a gaseous stream containing ammonia and possibly $CO_2$ deriving from the hydrolysis of urea.

The regenerated aqueous washing solution is subsequently used for abating further ammonia from the starting gaseous stream in phase (a) of the process according to the present invention, i.e. it is recycled (phase c) to the so-called scrubber phase, after possible recovery of the heat contained therein and/or concentration, for example by means of evaporation under vacuum. Before being recycled to phase (a), the regenerated aqueous washing solution can require the addition of the quantity of water and acid or buffer solution necessary for maintaining the desired concentration and pH (make-up solution).

The ammonia contained in the gaseous stream leaving phase (b) can be used in different ways. In a preferred embodiment of the above process, the gaseous stream comprising $NH_3$, $H_2O$ and possible $CO_2$ coming from the hydrolysis of the traces of urea, leaving phase (b), is recycled to a urea synthesis process. Alternatively, the above gaseous stream can be fed to a synthesis process of ammonia. In both cases, before being fed to these plants, the gaseous stream comprising ammonia can be optionally subjected to recovery of the heat contained therein by means of a suitable heat exchanger. The gaseous stream comprising ammonia leaving phase (b) can also be condensed to form an aqueous solution of ammonia which can be recycled to other industrial processes.

In a preferred embodiment which envisages the use in phase (a) of a washing solution consisting of a buffer solution in which the conjugate acid-base pair is $H_2PO_4^-/HPO_4^{2-}$, the solution of $(NH_4)_2HPO_4$ and $(NH_4)H_2PO_4$ coming from phase (a) and sent to the membrane distillation has a concentration in $NH_4^+$ ions which varies from 3 to 12% by weight.

In one embodiment, the MC device used for the distillation returns the following main products:
- a regenerated aqueous washing solution consisting of a buffer solution containing the species $HPO_4^{2-}$ and $H_2PO_4^-$, in a quantity ranging from 20 to 40% by weight, preferably from 30 to 35% by weight, which is recycled to the so-called scrubbing phase, after the possible addition of the required amount of water and make-up solution;
- a gaseous stream comprising from 5 to 35%, preferably from 15 to 25%, by weight of ammonia.

The improved process according to the present invention therefore allows the recovery of polluting products such as ammonia and urea contained in a gaseous stream, advantageously allowing concentrated ammonia solutions to be obtained. These solutions consequently do not require specific thermal treatment before being recycled to further industrial processes, such as for example the synthesis of urea. The process therefore has a high energy efficiency.

Furthermore the process according to the present invention has the following further advantages deriving from the use of membrane distillation:
- a high separation efficiency of ammonia also in diluted solutions, as, due to the fact that the interface surface consists of pores of the membrane, it does not change with a variation in the flow conditions of the transport stream and feeding stream;

absence of the formation of emulsions as there is no dispersion phenomenon between the fluids;

the fluids in contact do not need to have a different density;

the scale-up procedures of membrane distillation processes are simplified, as an increase in the volume of the feeding stream to be treated corresponds to a linear increase in the number of modules (MC devices);

there is no entrainment of part of the solution to be regenerated or regenerated into the gaseous stream containing ammonia possibly fed to the urea plant: this prevents the process streams of the urea plant from being polluted with substances unrelated to the same process;

there are no moving mechanical parts subject to wear or possible breakage;

reduced encumbrance of the equipment necessary for the distillation.

Furthermore, with respect to the membrane distillation processes known in the state of the art, that used in the recovery process of ammonia according to the present invention offers the advantage of being able to be carried out with substantially non-basic solutions, with consequent reduced consumptions of basifying compounds.

The process according to the present invention also has a high energy efficiency deriving from the preferred use of microwaves for heating the membrane distillation devices.

In the case of the application of the process according to the present invention to the recovery of ammonia from a gaseous stream also comprising urea, a further advantage can also be found in the possibility of substantially eliminating all the urea present: in phase (b), in fact, the temperature and pressure conditions cause the hydrolysis of a fraction of urea, whereas, as the remaining fraction is recycled to phase (a), it is not dispersed in the environment.

A preferred embodiment of the process according to the present invention is illustrated in the enclosed FIG. 1, which schematically represents the treatment steps of a gaseous purging stream leaving the prilling or granulation section of a synthesis process of urea.

The functional details, such as pumps, valves and other items of equipment not significant for a full understanding of the schematized processes, are not shown in the above-mentioned FIG. 1. The process, object of the present invention, should in no case be considered as being limited to what is described in the enclosed figure, which has a purely illustrative function.

Furthermore, in order to simplify the present description, the term "liquid" is used indifferently with reference to streams or mixtures consisting of a single liquid phase or a mixed liquid-vapour phase. The term "gaseous" is used for streams or mixtures in which the liquid phase is substantially absent.

The scheme shown in FIG. 1 illustrates a prilling or granulation section P, connected through line 1 to a water washing section A, possibly coming from the urea plant and containing impurities of ammonia and urea. This section A comprises a water inlet line 2, an outlet line 3, and is connected, through line 4, to the scrubber section S. The scrubber section S comprises an inlet line 5a, an air outlet line 6 and is, in turn, connected to an accumulation tank SA, through line 7. The accumulation tank SA is connected, through lines 5 and 5a, to the scrubber S and through line 10a to a heat exchanger SC. The heat exchanger SC is in turn connected through line 10b to the membrane distillation unit MD, which comprises MC devices based on microporous membranes (not visible in FIG. 1). The MD unit is connected by means of lines 16 and 16a and 5a to the scrubbing section S. The MD unit also comprises an outlet line 18 of the vapours comprising the ammonia recovered from the gaseous purging stream by means of the process of the present invention.

With reference to FIG. 1, a possible embodiment of the process of the present invention is described hereunder, even if this description does not limit the overall scope of the invention itself.

The gaseous purging stream coming through line 1 from the prilling or granulation section P, consists of air contaminated by ammonia (about 50-150 mg/Nm$^3$ air), urea (about 100-200 mg/Nm$^3$ air) and traces of formaldehyde. This stream is sent to a water washing section A. This section A has two feeding streams, a stream consisting of water, which is fed through line 2 and a gaseous purging stream coming from the section P, through line 1. The gaseous stream at the outlet of the water washing section A, through line 4, consists of air, ammonia, urea and traces of formaldehyde. Part of the urea present in the initial gaseous stream has therefore been eliminated by the water washing and can be found in the aqueous solution at the outlet through line 3. This is preferably sent to the vacuum concentration section (not shown in the figure) of the urea synthesis plant, for the recovery of the latter.

The gaseous stream at the outlet of the water washing section A, through line 4, is sent to the scrubber section S, where it is subjected to a washing with an acid aqueous solution of $(NH_4)_2HPO_4$ and $(NH_4)H_2PO_4$ having an overall concentration of the phosphate ions ranging from 30 to 40% by weight, a pH ranging from 5 to 6 and a temperature ranging from 30 to 50° C., with the formation of a gaseous stream comprising substantially pure air which is released into the atmosphere through line 6 and an aqueous solution enriched in $(NH_4)_2HPO_4$, which is fed through line 7 to an accumulation tank SA. In the water washing section A, a quantity of washing solution is used, which is sufficient for reducing the ammonia content to the desired value, normally to a value lower than 20 mg/m$^3$, and possible urea, normally to a value lower than 30 mg/m$^3$, in the gaseous stream. The volume of washing solution used preferably ranges from 0.5 to 3 liters per Nm$^3$ of gaseous stream.

The water washing section A can also be absent and in this case the gaseous purging stream 1 coming from section P is sent directly to the scrubber section S.

The accumulation tank SA, when present, allows a greater volume of washing solution to be available to be recycled through lines 5 and 5a to the scrubber section S. The process can therefore operate, according to the usual operation modes with recycling, with a more concentrated solution of the conjugate acid-base pair. The regenerated aqueous solution coming from the MD section through lines 16 and 16a, is added to the washing solution leaving the accumulation tank SA, through line 5, after the addition of water, through line 21, to compensate that evaporated in the scrubber and in the membrane distillation in the MD section. Streams 5 and 16a, thus joined, are recycled by means of line 5a to the scrubber S.

A part, more preferably from 0.2 to 5% of the stream used in the scrubber, of the acid aqueous solution containing $(NH_4)_2HPO_4$ and $(NH_4)H_2PO_4$, is sent, through lines 10a and 10b, from the accumulation tank SA to the membrane distillation section MD, after heating to a temperature ranging from 80 to 100° C. in the heat exchanger SC, for example by thermal exchange with the stream leaving the section MD through line 16 (the use of the stream leaving the section MD in the heat exchanger SC through line 16 is not shown in FIG. 1).

In the MD unit, the aqueous solution containing $(NH_4)_2HPO_4$ and $(NH_4)H_2PO_4$ is treated at a temperature ranging from 120 to 180° C. and a pressure ranging from 0.2 to 1.5 MPa absolute, with the formation of a gaseous stream comprising $NH_3$, $H_2O$ and $CO_2$ which is removed through the outlet line 18 and can be recycled to the synthesis section of the urea process or alternatively to a synthesis process of ammonia.

The membrane distillation unit of the MD section can consist of a cylindrical apparatus arranged horizontally, in which a series of tubular elements are aligned, consisting of cylindrically-shaped hydrophobic microporous membranes, connected at the ends with a distribution chamber and a collection chamber. The buffer solution to be regenerated is preferably passed outside the tubular elements i.e. in the space on the shell side. In this preferred case, the vapours of water, ammonia and possible carbon dioxide, are released, through the membranes, into the space inside the tubular elements, and then collected at the outlet in line 18.

The pressure differential between the buffer solution on the shell side and the vapours on the internal side of the microporous tubes is conveniently maintained at 40 to 150 kPa and in any case is lower than the pore wetting limit, to avoid the pore wetting phenomenon. In order to have a greater toleration of the pressure differential, the microporous membranes can be possibly supported with a rigid material permeable to vapours, which in the above preferred case consists of a hollow tube on which the membranes are wound, whereas it can be a tube containing the membranes in its interior, if the solution to be regenerated is passed on the tube side of the apparatus in the MD unit.

Heat can be supplied to the MD unit, for example by means of medium or high pressure vapour, sent from line 11, which passes through a tube bundle or a heating jacket and exits, condensed, through line 12. More conveniently, however, the necessary heat can be provided by suitably irradiating the solution in contact with the microporous membranes by means of an MO device generating a beam of microwaves at a frequency within the range of 2,300 to 2,700 MHz, preferably from 2,400 to 2,600 MHz. The most suitable frequencies for an optimum absorption of the polar molecules present in the solution treated, can be easily selected by an expert in the field in relation to the composition and temperature of the solution, on the basis of the absorption characteristics indicated in literature or simple preliminary scan tests. In this case, the rigid materials forming the apparatus (mantle and possible cylindrical supports made of vapour-permeable material), must be selected from those transparent to microwaves within the frequency range used.

The MD section also returns a regenerated washing solution, having a higher content of diacid phosphate with respect to the inlet aqueous solution, but a substantially identical pH, due to the high overall concentration of $HPO_4^{2-}$ and $H_2PO_4^-$ species and to the consequent high buffer effect. This solution is recycled to the acid scrubber section S, through lines 16, 16a and 5a. If necessary, phosphoric acid or ammonium phosphate can be added to this solution to compensate possible losses of buffer solution, for example, due to the entrainment of micro-drops of liquid in the washing phase (a) of the gaseous stream.

The following embodiment example is provided for purely illustrative purposes of the present invention and should in no way be considered as limiting the protection scope defined by the enclosed claims.

EXAMPLE 1

A gaseous purging stream coming from a urea production plant, consisting of air contaminated by ammonia (94 mg/Nm³ air), urea (185 mg/Nm³ air) and traces of formaldehyde, was subjected to the process according to the present invention. With the plant functioning under regime conditions, 300,000 Nm³/h of the above stream were sent directly to a scrubber operating with a washing solution consisting of a buffer solution of $(NH_4)_2HPO_4$ and $(NH_4)H_2PO_4$ having a pH equal to about 5.3.

The following products were thus obtained from the scrubber:
  a purified gaseous stream (300,000 Nm³/h) having a concentration of ammonia equal to about 9.4 mg/Nm³ (abatement efficiency of the scrubber equal to about 90%) and a concentration of urea equal to about 27.8 mg/Nm³ (abatement efficiency of the scrubber equal to about 85%);
  a stream of 607,381 kg/h of aqueous solution containing the ammonium salt consisting of water (323,944 kg/h), $H_2PO_4^-/HPO_4^{2-}$ ions (221,129 kg/h), ammonia in the form of $NH_3$ and $NH_4^+$ (52,638 kg/h) and urea (10,120 kg/h).

The aqueous solution leaving the scrubber was then fed to an accumulation tank (SA) from which a stream having the same composition was extracted in continuous, and then fed to a hydrophobic membrane distillation unit (MD unit) with a flow-rate of 2.34 m³/h, equal to 2831.4 kg/h (density of the solution 1210 Kg/m³). The stream entering the membrane distillation unit, having a pH equal to 5.3, consisted of water (1509.0 kg/h), $H_2PO_4^-/HPO_4^{2-}$ ions (1030.1 kg/h), ammonia in the form of $NH_3$ and $NH_4^+$ (245.2 kg/h) and urea (47.1 kg/h).

The MD unit was maintained at a temperature of 150° C. and a pressure of 0.3 MPa. The following products were thus separated in the MD unit:
  a gaseous stream (196.6 kg/h), containing ammonia and having the following composition
  water (vapour)=123.2 kg/h
  $NH_3$=38.8 kg/h
  $CO_2$=34.6 kg/h
  a regenerated washing solution (2635.6 kg/h) having a pH equal to 5.3 and the following composition
  water (vapour)=1385.8 kg/h
  $H_2PO_4^-/HPO_4^{2-}$=1030.0 kg/h
  $NH_3/NH_4^+$=219.8 kg/h On comparing the quantity of ammonia present in the gaseous stream 18 leaving the MD unit (38.8 kg/h) with the content of ammonium ($NH_4^+$) in the stream entering the MD unit (245.2 kg/h), a separation efficiency of step (b) of the present invention was observed equal to 15.5% by weight of ammonia.

The above regenerated washing solution was recycled to the scrubber to integrate a stream of solution coming from the tank SA (605,000 kg/h). For this recycling, it was necessary to add a stream of make-up water of 2123.2 kg/h to the regenerated washing solution, to compensate the quantity of water transferred to the gaseous stream purified by evaporation during the scrubbing step, and also the water evaporated in the membrane distillation step.

The invention claimed is:

1. A process for removing ammonia from a gaseous stream, the process comprising:
   (a) washing a gaseous stream comprising ammonia with an aqueous washing solution having a pH of lower than 7.0 and comprising a conjugate acid-base pair deriving from phthalic acid, oxalic acid, phosphoric acid, citric acid, an aryl-phosphonic acid, and an alkyl-phosphonic acid, to obtain a purified gaseous stream and an aqueous solution comprising an ammonium salt;
   (b) distilling the aqueous solution comprising the ammonium salt from (a) with a hydrophobic microporous membrane at a temperature ranging from 50 to 250° C.

and a pressure ranging from 50 KPa to 4 MPa absolute, to obtain a regenerated washing solution and a gaseous stream comprising NH3 and H20, (c) recycling the regenerated washing solution into (a).

2. The process of claim 1, wherein the gaseous stream in (a) is a gaseous purging stream from a synthesis process of urea.

3. The process of claim 2, wherein the gaseous purging stream comprises air contaminated by ammonia in an amount of from about 50 to 250 mg/Nm$^3$ air, urea in an amount of from about 30 to 200 mg/Nm$^3$ air, and traces of formaldehyde.

4. The process of claim 2, wherein the gaseous purging stream is at a temperature of about 45-100° C., and is subjected to a preliminary washing with water.

5. The process of claim 1, wherein the buffer solution has a pH ranging from 5 to 6.5 and an overall molar concentration of the conjugate acid-base pair ranging from 0.5 M to 5 M.

6. The process of claim 1, wherein the distilling (b) is carried out at a temperature ranging from 130 to 180° C., and a pressure ranging from 0.15 to 1.5 MPa absolute.

7. The process of claim 6, wherein the distilling (b) is carried out at about 0.3 MPa and at a temperature of about 150° C., to obtain a gaseous stream comprising $NH_3$, $H_2O$, and $CO_2$ in which the concentration of ammonia varies from 5 to 35% by weight.

8. The process of claim 1, wherein purified gaseous stream obtained in (a) is released into the atmosphere.

9. The process of claim 1, wherein the purified gaseous stream obtained in (a) comprises air or another inert gas having an ammonia content ranging from 10 to 25 mg/Nm$^3_{air}$ and, optionally, a urea content ranging from 5 to 30 mg/Nm$^3_{air}$.

10. The process of claim 1, wherein gaseous stream comprising $NH_3$ and $H_2O$ obtained in (b) is recycled to a synthesis process of urea or to a synthesis process of ammonia.

11. The process of claim 1, wherein the distilling (b) is carried out by supplying heat with electromagnetic waves.

12. The process of claim 1, wherein the quantity of water or acid, necessary for maintaining the desired concentration and pH, is added to the regenerated aqueous washing solution from (b).

13. The process of claim 1, wherein in the hydrophobic membrane distillation in (b), an additional transport stream is employed.

14. The process of claim 1, wherein, during the distilling, the urea present in the aqueous solution is at least partially hydrolyzed to form $NH_3$ and $CO_2$.

15. The process of claim 1, wherein washing is carried out by contacting the gaseous stream with the aqueous washing solution in a scrubber.

16. A process for removing ammonia from a gaseous stream, the process comprising:

(a) washing a gaseous stream comprising ammonia with an aqueous washing solution having a pH lower than 7.0 and comprising the conjugate aci-base pair $H_2PO4^-$/ $HPO_4^{2-}$ in which the overall concentration of the $H_2PO4^{31}$ /$HPO_4^{2-}$ species varies from 20 to 40% by weight, to obtain a purified gaseous stream and an aqueous solution comprising an ammonium salt;

(b) distilling the aqueous solution comprising the ammonium salt from (a) with a hydrophobic microporous membrane at a temperature ranging from 50 to 250° C. and a pressure ranging from 50 KPa to 4 MPa absolute, to obtain a regenerated washing solution and a gaseous stream comprising $NH_3$ and $H_2O$;

(c) recycling the regenerated washing solution into (a).

* * * * *